United States Patent Office 3,554,733
Patented Jan. 12, 1971

3,554,733
PROCESS OBTAINING SULFUROUS GASES AND MAGNETITE OR IRON SPONGE FROM WASTE FERROUS SULFATE
Umberto Colombo, Novara, Iti Mini, Milan, and Giuseppe Sironi, Novara, Italy, assignors to Montecatini Edison S.p.A., Milan, Italy, a corporation of Italy
Filed June 29, 1967, Ser. No. 650,109
Claims priority, application Italy, July 1, 1966, 15,164/66
Int. Cl. C01g 49/08
U.S. Cl. 75—1
10 Claims

ABSTRACT OF THE DISCLOSURE

A process for obtaining concentrated sulfurous gases and magnetite or iron sponge with high iron content, which are valuable products for the iron-metallurgic industry, from heptahydrate ferrous sulfate. The process is broadly characterized by the following sequence: (a) Dehydration of the heptahydrate ferrous sulfate to the monohydrate form; (b) thermal decomposition of the monohydrate ferrous sulfate in a fluidized bed; (c) reduction of the hot hematitic ashes in a fluidized bed or in a rotary furnace, to magnetite or to sponge iron; (d) magnetic concentration of the product obtained in (c) with consequent elimination of the impurities undesirable in iron metallurgy and obtainment of a concentrate of high Fe grade; (e) preheating of the air necessary for operations (a), (b) and (c) by means of heat exchange with the hot sulfurous gases produced in (b); and (f) utilization of the sensible and chemical heat of the gases leaving the reduction (c) for the thermal decomposition of the monohydrate ferrous sulfate and/or for the dehydration of the heptahydrate ferrous sulfate to the monohydrate form.

---

Figure 1:
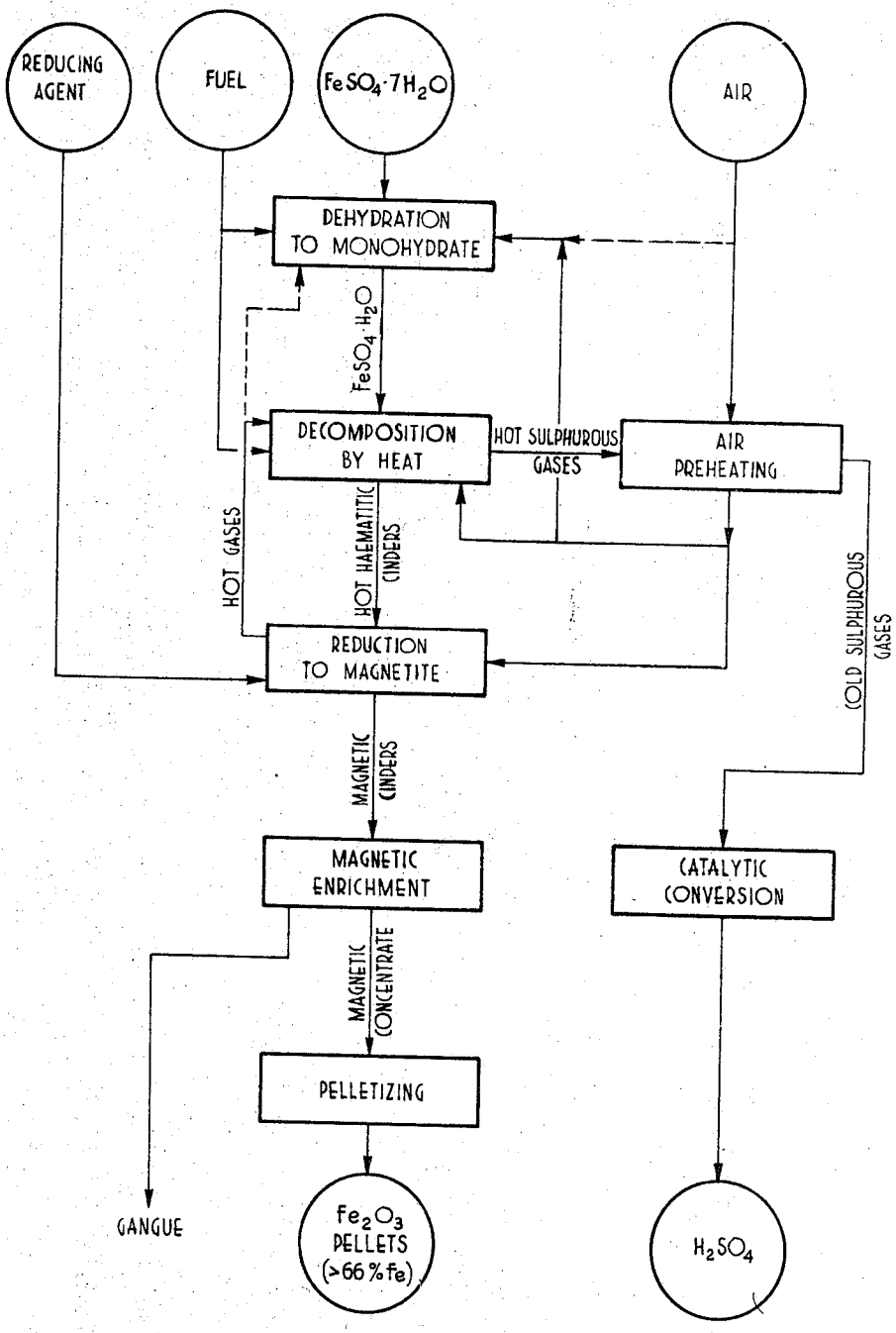

Ferrous sulfate, in its mono- and heptahydrate forms, is a by-product of some important industrial processes, such as for instance, the production of $TiO_2$ pigment by sulfuric acid attack of ilmenite and the operations of picking of rolled steel sections. In the case of acid attack of ilmenite, more than 5 tons of $FeSO_4.7H_2O$ for each ton of pigment produced are normally obtained. The heptahydrate ferrous sulfate has to date been considered a waste material to be disposed, because it, per se, has no economic value, and because its transformation to useful products appears to be excessively expensive.

Among the various methods described in literature, tending to transform ferrous sulfate for possible industrial utilization, are:

(1) Treatment with ammonia to produce ammonium sulfate and iron hydroxide. This process was not competitive with the normal synthesis of ammonium sulfate, chiefly because of the difficulties inherent with the separation by filtration or by centrifuging of the iron hydroxide produced.

(2) The treatment of ferrous sulfate with gaseous HCl in order to recover sulfuric acid and, by calcination of the $FeCl_2$ formed, an iron oxide of low value. This process, although theoretically interesting, has not been utilized on an industrial scale because of the high investments it necessitates, because of the considerable corrosion problems and because of the impurity of the iron oxides obtained, which contain chloride and sulfates not tolerable for many industrial uses.

(3) The electrolysis of an aqueous solution of $FeSO_4$ in cells with semipermeable membranes in order to recover $H_2SO_4$ and metallic iron. Besides the high consumption of electric energy, this processs brings about some considerable difficulties, due to the working of the anionic membranes with considerably impure solutions, such as those existing in practice.

(4) The treatment with cationic ion exchange resins to recover free sulfuric acid and obtain iron oxide by elution of the resin column with HCl and calcination of the iron chloride separated. This process has not found industrial application, because of the high costs of the concentration and crystallization of $FeCl_2$ and of the calcination of the latter, obtaining iron oxide and recovery of HCl.

Greater industrial interest have presented the processes based on the thermal decomposition of ferrous sulfate, using as heat source fuel oil or coal, sulfur or pyrite. This operation, normally carried out at a temperature of 800–1000° C., leads to the obtainment of sulfurous gases (which can be used for the production of $H_2SO_4$) and of very fine hematitic ashes of relatively low Fe content, containing about 1% of S, and all the non-ferrous metallic impurities contained in the starting salt. For instance if the ferrous sulfate originates from the transformation of ilmenite to $TiO_2$ pigment, the impurities can be Ti, Pb, Cu, Zn. Consequently, the ashes up to now did not form a raw material, economically valuable, for iron metallurgy. Thus, this treatment of ferrous sulfate was not economically interesting.

From the above, it appears evident that, notwithstanding the considerable research work developed in this field none of the processes up to now proposed, resulted satisfactorily from an economical point of view. For this reason, ferrous sulfate is still considered a waste material to be eliminated. On the other hand, the water pollution laws presently in force and continuously being made more stringent in the principal countries of the world, place strong limitations to the discharge of ferrous sulfate into canals and rivers, as this salt causes great inconveniences both to the ichthycal patrimony and to the agricultural cultivations, because of its tendency to hydrolize under formation of free sulfuric acid.

The discharge of this salt in the open sea, besides being very expensive, especially for factories situated far from the coast, causes uncontrollable damages to the sea fauna. Thus, today there is a tendency to place further limitations on such discharge, forcing the discharge to be particularly expensive in being beyond the territorial waters or at least in very deep waters. A reduction of the deleterious consequences of the discharge of ferrous sulfate per se, is obtained by treating of the salt with lime, so as to neutralize the sulfuric acidity and obtain harmless and insoluble products for disposal. However, this method is also expensive. The problem of the elimination of ferrous sulfate, which continues to increase with time, conditions the whole development of industrial plants (situation, sizes) in which this salt is obtained as waste product.

We have found a way to economically use ferrous sulfate with production of sulfuric acid and of a valuable material for the iron-metallurgy industry. This material consists of an iron oxide of high Fe grade and with non-ferrous metal content within the limits, normally tolerable in iron metallurgy, or of metallic iron in the form of sponge iron of high purity.

The process of our invention is characterized by the following sequence:

(a) Dehydration of the heptahydrate ferrous sulfate to monohydrate ferrous sulfate;

(b) Thermal decomposition (at 800–1050° C.) of the monohydrate ferrous sulfate in a fluidized bed by heat of combustion of carbonaceous substances (solid, liquid and gaseous fuels) or of sulphur ore (pyrite, pyrrhotine, sulfur);

(c) Reduction in a fluidized bed or in a rotary furnace (at 650°–900° C.) of the hot hematitic ashes obtained in the thermal decomposition, by direct injection of the carbonaceous fuels to yield magnetite or sponge iron;

(d) Magnetic concentration of the product obtained in (c), carried out by a dry or a wet process or by a mixed process, to obtain a concentrate (magnetite or sponge iron) of high iron grade;

(e) Preheating (to 200–500° C.) of the air necessary for the phases of the process (dehydration, thermal decomposition, reduction) by exchange with the sulfurous gases produced in the thermal decomposition, with consequent increase of the concentration of $SO_2$ and decrease of the fuel consumption; and (f) Recovery and utilization of the residual heat and the considerable heat of the gases coming from the reduction, for the thermal decomposition or for the dehydration of the heptahydrate sulfate or for both operations. The recovery can also be indirect, with production of the steam necessary for the dehydration, in case this is carried out by a wet process.

The operations (a), (b) and (e) are almost identical in both alternatives, while the reduction must be carried out varying the reducing means according to whether one desires to obtain magnetite or sponge iron. This fact substantially affects the heat recoveries thereof at item (f). In the alternative of reduction of the ashes to iron sponge in the reduction room, a considerable amount of high-pressure steam is also recovered. The product of the reduction is magnetically concentrated. This operation allows almost total elimination of the non-ferrous metallic impurities undesirable in iron metallurgy.

The magnetite concentrate can be pelletized (at a temperature higher than 1200° C. in order to decompose the occasionally present alkaline earth sulfates) and employed in iron metallurgy, for instance for the feeding of the blast furnaces. The concentrate of sponge iron can be briquetted and employed for the production of steel, for instance in an electric furnace or in a converter.

Figure 2:
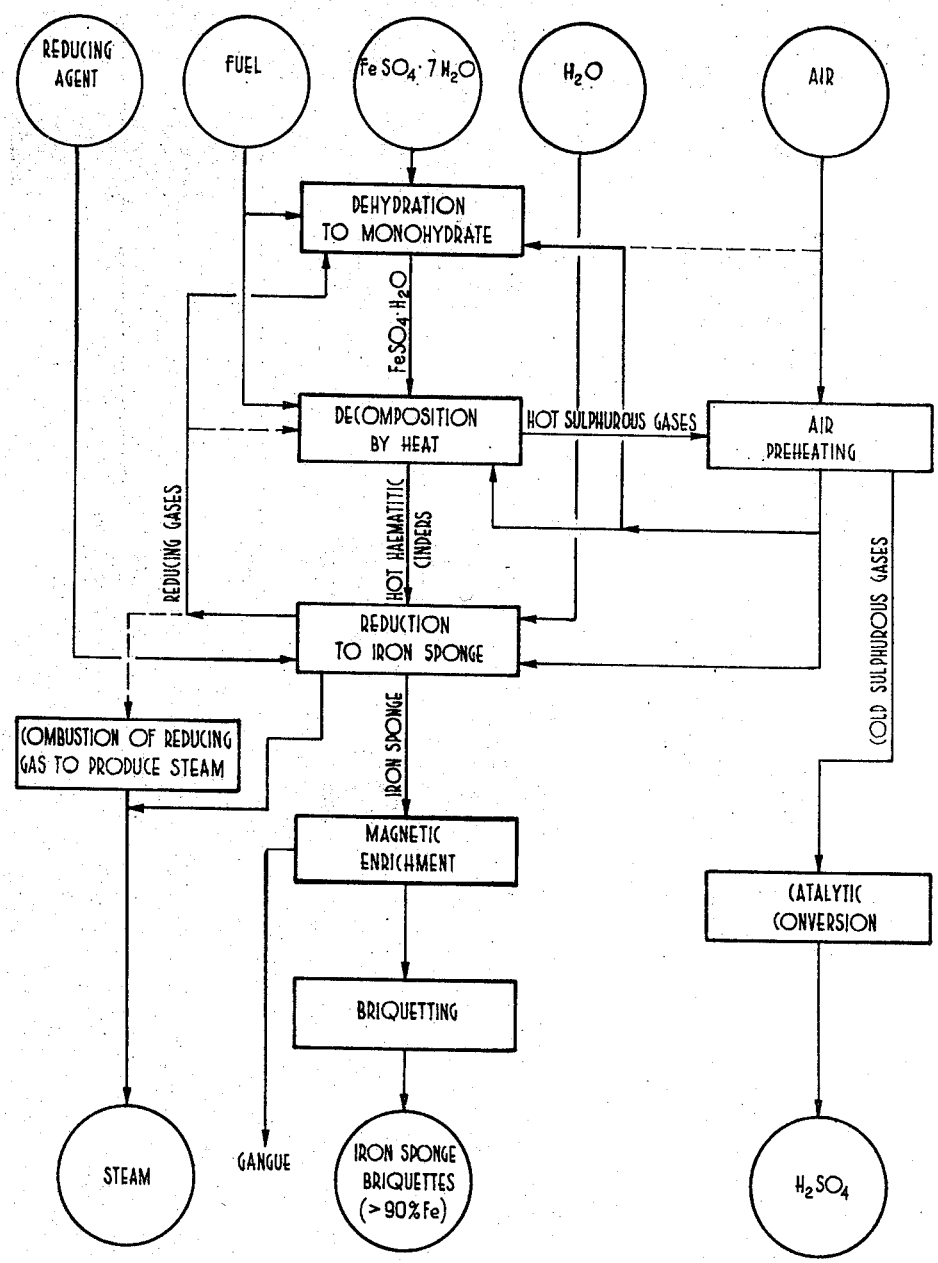

In the drawings:

FIG. 1 schematically shows the production of pellets, having a high iron grade;

FIG. 2 schematically shows the production of sponge iron; and

Figure 3:
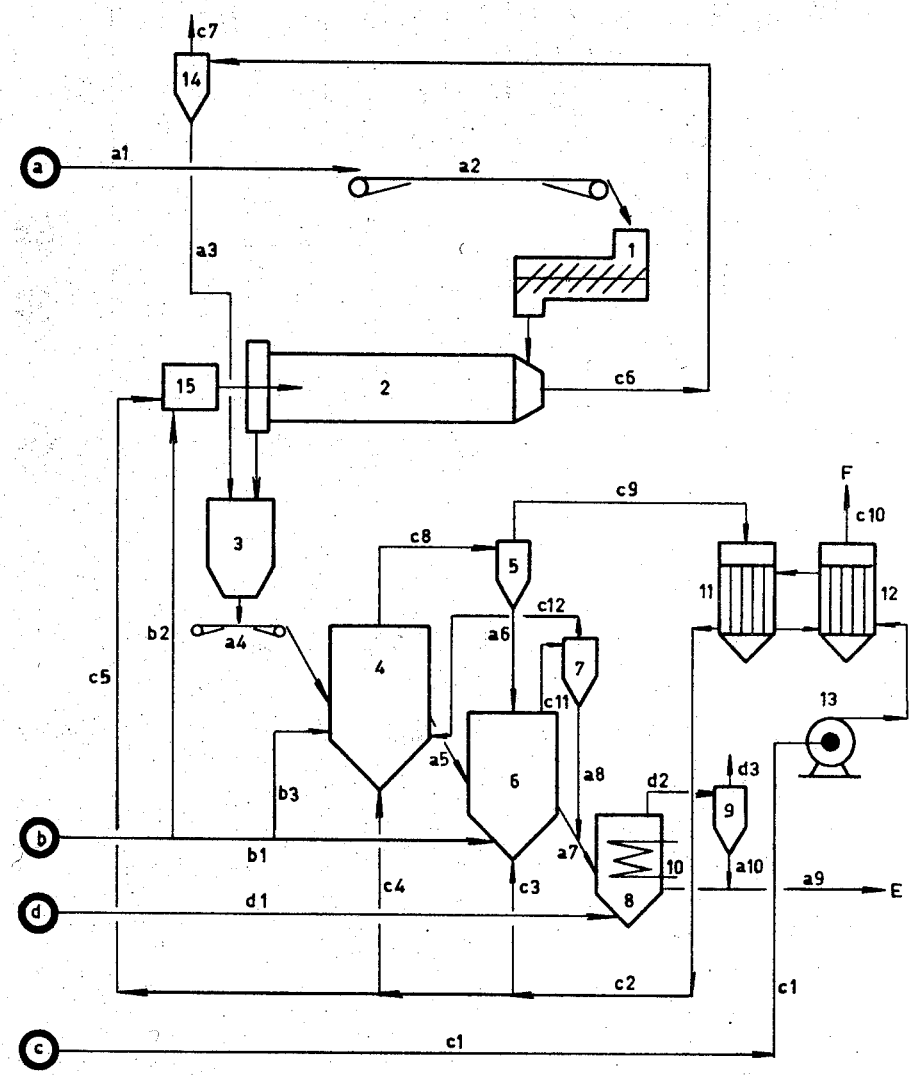

FIG. 3 shows an embodiment of the process up to obtaining magnetite ashes (E) and concentrated sulfurous gases (F).

In both FIG. 1 and FIG. 2, the economy of the process is bound to the integration of the various phases, which allows a favorable heat balance of all the operations and, therefore, a low fuel consumption coupled with the obtainment of sulfurous gases of high $SO_2$ content and of valuable products for the iron-metallurgic industry.

FIGS. 1 and 2 are self-explanatory. In FIG. 3, the heptahydrate ferrous sulfate $a$ is fed $a1$ by a conveyor belt $a2$ to the meter 1 and from there to the relative dehydration furnace 2. The hot gases are supplied by the burner 15, fed with fuel oil $b2$ and with preheated air by C5. The gases leaving the furnace 2 are sent through $c6$ into the cyclone 14 and from there are discharged into the atmosphere. The fine $FeSO_4 \cdot H_2O$ is discharged through $a3$ into the hopper 3.

The monohydrate ferrous sulfate leaving furnace 2 is discharged into the hopper 3 and from there is passes, through the metering conveyor belt $a4$, into the fluid-bed decomposing furnace 4, into which fuel oil $b$ is injected by $b1$, $b3$, preheated air by $c4$ and hot gases by $c12$. The hot sulfurous gases leaving 4 through $c8$ have the ashes removed in cyclone 5 and from there they pass, through $c9$, into the heat exchangers 11 and 12, where they preheat the air entering the cycle and exit through $c10$; they (F) are sent to catalysis for production of sulfuric acid.

The hot hematitic ashes, discharged from the furnace 4 through $a5$ and from the cyclone 5 through $a6$, feed the production furnace 6, where the transformation of $Fe_2O_3$ in $Fe_3O_4$ takes place.

Into the fluidized bed, fuel oil $b$ is fed by $b1$ and preheated air by $c3$. The hot gases, leaving 6 through $c11$, after the fine ashes are separated in cyclone 7, are sent into the furnace 4 through $c12$. The fine ashes of the cyclone 7 joint, through $a8$, the ashes of the bed which, from the furnace 6, are sent through $a7$ into the fluidized cooling bed 8, which is fluidized with steam or inert gas $d$ from $d1$. The gases leave by $d2$. The cooling is carried out with air or water from the coil 10 immersed in the bed. The gases leaving 8 are sent by $d2$ to the cyclone 9, in order to separate the gases charged by $d3$ and the fine ashes, which are joined to $a9$ through $a10$. The ashes (E) cooled to about 180° C. leave $a9$ to go to the following phases of magnetic concentration and pelletization.

The integration of the various phases of the process of treatment of ferrous sulfate, according to the present invention, make possible the obtainment, under economically favorable conditions, of sulfuric acid and ferrous products of high grade and purity, thus resulting in the following advantages:

(i) Substantially complete utilization of the heat developed within the very process, with obtainment of concentrated sulfurous gases, and reduction to a minimum of the heat losses due to the products leaving the cycle (sulfurous gases, ashes, exhausted gases);

(ii) Reduction of the hot hematitic cinders with consequent employment of their considerable heat, keeping the consumption of reducing agent the lowest necessary in this phase;

(iii) Almost complete elimination, in the magnetic concentration zone, of impurities, undesirable in iron metallurgy, particularly copper, lead, zinc, titanium, present in the hematitic cinders;

(iv) Possibility of employing, as fuel for the thermal decomposition of the monohydrate ferrous sulfate, also ores of low or medium Fe and S content, as the ashes produced are subsequently magnetically concentrated.

The invention will now be illustrated with some examples, which are intended by way of example without limitation.

EXAMPLE 1

1600 kg. of impure heptahydrate ferrous sulfate, obtained in the attack of ilmenite with sulfuric acid, are dehydrated in a rotary furnace, burning fuel oil with air preheated to 300° C. 1000 kg. of monohydrate ferrous sulfate are obtained, having the following composition:

| | Percent |
|---|---|
| $FeSO_4$ | 72.33 |
| $Fe_2O_3$ | 1.75 |
| $SiO_2$ | 0.73 |
| $CaO$ | 0.28 |
| $MgO$ | 2.02 |
| Pb | 0.05 |
| $TiO_2$ | 0.8 |
| Total S | 17.9 |
| $H_2O$ | 11.92 |

The monohydrate ferrous sulfate leaving the rotary furnace is sent into a fluidized bed reactor, where it is decomposed at 900° C. using 66 kg. of Bunker C fuel oil (C, 85%; H, 11%; whose heat value is above 10,600) and air in slight deficiency to the oil for complete combustion, preheated to 450° C., together with the gases at 650° C. leaving the reduction stage. 980 Nm.³ of sulfurous gases, containing 12.2% of $SO_2$ and 2.2% of $O_2$ in the dry product, are obtained. The hot hematitic ashes (500–700° C.) obtained feed by gravity the magnetite reducing furnace. The magnetite reduction is carried out at 650°–700° C. by direct injection of 14 kg. of Bunker C oil and 60 Nm.³ of air preheated to 450° C. The gases leaving the reducing reactor are recycled to the decomposing furnace. The reduced and cooled ashes are concentrated with magnetic separators by a dry process, obtaining 378 kg. of magnetic concentrate containing 67% of Fe (Fe recovery 94%), 0.2% of $TiO_2$, 0.02% of Pb and 0.23% of S. After pelletization at a maximum baking temperature of 1250° C., the Fe grade is 66% and the S content 0.01%. The preheating of the air for the dehydration, the decomposition and the reduction, is obtained by heat exchange with the sulfurous gases at 900° C., leaving the decomposition stage.

EXAMPLE 2

1000 kg. of monohydrate ferrous sulfate, having the composition indicated in Example 1, are decomposed at 950° C. in a fluidized bed reactor, with 535 kg. of pyrite containing 47% of S and 43% of Fe, and with air preheated to 450° C., obtaining 1450 Nm.$^3$ of gas containing 20.3% of S, and 3% of $O_2$. The hematitic ashes obtained at 600–700° C. feed by gravity, the magnetite reducing furnace. The magnetite reduction is carried out at 650–700° C. by direct injection of 22 kg. of Bunker C oil and of air preheated to 450' C. The hot gases leaving the reducing furnace are employed in the dehydration of the heptahydrate ferrous sulfate, combining with fuel oil and air. The reduced ashes thus obtained are cooled to 150° C. by introduction of water, in a fluidized bed by means of steam or inert gas, and concentrated with magnetic separators with dry or wet processes, obtaining 720 kg. of concentrate containing 66% of Fe and 0.1% of $TiO_2$. After pelletization at a maximum baking temperature of 1270° C., the S content is less than 0.01%.

EXAMPLE 3

1600 kg. of heptahydrate ferrous sulfate are dehydrated in a fluidized bed furnace, using as fuel 1150 Nm.$^3$ of hot residual gases of the subsequent reduction to sponge iron. 1000 kg. of monohydrate ferrous sulfate are obtained, which are decomposed in a fluid-bed furnace at 920° C., with 50 kg. of Bunker C oil, 300 Nm.$^3$ of residual combustible gas of the reduction to sponge iron, and with air preheated to 450° C. by the sulfurous gases leaving the furnace. The hot hematitic ashes obtained feed by gravity, a two-stage fluid-bed reducing reactor, fed with 800 Nm.$^3$ of air and 200 kg. of Bunker C fuel oil. An impure iron sponge is obtained which after magnetic concentration, gives a production of 267 kg. of sponge iron containing 92% of Fe. Of the gases leaving the reduction (1450 Nm.$^3$ of gas containing 25% of CO+$H_2$), 1150 Nm.$^3$ are employed for the dehydration of the ferrous sulfate, after previous combustion with air preheated to 300° C. for the heat exchange with the sulfurous gases, and 300 Nm.$^3$ for the decomposition.

We claim:

1. A process for obtaining cencentrated sulfurous gases and magnetite or iron sponge with high iron content (and suitable for ferrous metallurgy) from heptahydrate ferrous sulfate, which comprises the following sequence of:
    (a) hydrating the heptahydrate ferrous sulfate to the monohydrate form;
    (b) thermal decomposing of the monohydrate ferrous sulfate to iron oxide (hematite) and sulfur dioxide in a fluid bed, by heat of combustion in air of a fuel selected from carbonaceous fuels and sulfur fuels;
    (c) reducing the hot hematite ashes in a fluidized bed or in a rotary furnace to a form selected from magnetite and sponge iron, by injection of carbonaceous fuels and air;
    (d) magnetically concentrating the product obtained in (c), consequently eliminating the impurities undesirable in ferrous metallurgy and obtaining a concentrate of high Fe grade;
    (e) preheating of the air necessary for the operations (b) and (c) by heat exchange with the hot sulfurous gases produced in (b); and
    (f) utilizing the sensible heat and heat of combustion of gases leaving the reduction (c) in at least one of the thermal decompositions of the monohydrate ferrous sulfate and the dehydration of the heptahydrate ferrous sulfate to the monohydrate form.

2. The process of claim 1, wherein the sensible heat and the heat of combustion of at least part of the gas leaving the step (c) of reduction of the ashes, is used in the operation (a) of dehydration of the heptahydrate ferrous sulfate.

3. The process of claim 2, wherein at least part of the gases leaving the reduction step (c) are employed to produce steam, which is used in the dehydration of the heptahydrate ferrous sulfate to the monohydrate form.

4. The process of claim 1, wherein for the operation (b) of thermal decomposition of the monohydrate ferrous sulfate, a sulfur selected from pyrite, pyrrhotite and sulfur is used.

5. The process of claim 1, wherein for the operation (b) of thermal decomposition of the monohydrate ferrous sulfate, a carbonaceous fuel selected from coal, fuel oils, natural gases, cokery gases and mixtures thereof is used.

6. The process of claim 4, wherein for the operation (b) of thermal decomposition, at least part of the hot gases leaving the reduction of the ashes are used.

7. The process of claim 1, wherein the operation (c) of reduction of the hot hematitic ashes is carried out by direct injection of pulverized coal, fuel oils, natural gases, cokery gases and mixtures thereof, together with air or oxygen.

8. The process of claim 1, wherein in the operation (e), the air necessary for the different phases of the process is preheated to temperatures from 200 to 500° C., employing the considerable heat of the sulfurous gases produced in the thermal decomposition of the monohydrate ferrous sulfate.

9. The process of claim 1, wherein operation (b) of thermal decomposiion of the monohydrate ferrous sulfate is carried out between 800 and 1050° C.

10. The process of claim 1 wherein the operation (c) of reduction of the hot hematitic ashes is carried out between 600 and 900° C.

References Cited

UNITED STATES PATENTS

| 2,021,687 | 11/1935 | Oliver | 23—177 |
| 2,202,414 | 5/1940 | Barnes et al. | 23—177 |
| 2,242,763 | 5/1941 | Smith et al. | 23—177 |
| 2,749,218 | 6/1956 | Heath | 23—200 |
| 3,053,626 | 9/1962 | Patterson | 23—177 |
| 3,265,464 | 8/1966 | Udd | 23—200X |
| 2,413,492 | 12/1946 | Firth | 23—200 |
| 2,773,743 | 12/1956 | Fackert | 23—172 |
| 3,044,868 | 7/1962 | Francis | 75—29 |
| 3,195,981 | 7/1965 | Hansford | 23—177 |

FOREIGN PATENTS

| 648,528 | 1/1951 | Great Britain | 23—126 |

OSCAR R. VERTIZ, Primary Examiner

G. O. PETERS, Assistant Examiner

U.S. Cl. X.R.

23—200